(12) United States Patent
Scatamacchia et al.

(10) Patent No.: US 8,676,792 B1
(45) Date of Patent: Mar. 18, 2014

(54) METHOD AND SYSTEM FOR AN INVITATION TRIGGERED AUTOMATED SEARCH

(75) Inventors: Holly Scatamacchia, Hampton, NH (US); Tara L. Tarapata, North Andover, MA (US); Matt Hart, Lunenburg, MA (US)

(73) Assignee: Intuit Inc., Mountain View, CA (US)

( * ) Notice: Subject to any disclaimer, the term of this patent is extended or adjusted under 35 U.S.C. 154(b) by 1182 days.

(21) Appl. No.: 12/238,588

(22) Filed: Sep. 26, 2008

(51) Int. Cl.
*G06F 7/00* (2006.01)
*G06F 17/00* (2006.01)
*G06F 17/30* (2006.01)

(52) U.S. Cl.
USPC ............................ 707/724; 707/713; 707/716

(58) Field of Classification Search
USPC .......... 709/203, 205, 206; 715/743, 744, 777; 705/3, 39
See application file for complete search history.

(56) References Cited

U.S. PATENT DOCUMENTS

| | | | |
|---|---|---|---|
| 7,082,430 B1* | 7/2006 | Danielsen et al. | 1/1 |
| 7,437,353 B2* | 10/2008 | Marmaros et al. | 1/1 |
| 2004/0024846 A1* | 2/2004 | Randall et al. | 709/219 |
| 2004/0243422 A1* | 12/2004 | Weber et al. | 705/1 |
| 2006/0143277 A1* | 6/2006 | Bauchot et al. | 709/206 |
| 2006/0253434 A1* | 11/2006 | Beriker et al. | 707/3 |
| 2007/0263825 A1* | 11/2007 | Shah et al. | 379/202.01 |

\* cited by examiner

*Primary Examiner* — Susan Chen
(74) *Attorney, Agent, or Firm* — Osha Liang LLP

(57) ABSTRACT

A method for performing an invitation triggered search by a query engine, involving receiving an invitation message associated with a project, wherein the query engine is a recipient of the invitation message, extracting at least one attribute from the invitation message, searching a plurality of sources to identify a plurality of resources associated with the at least one attribute, and sending a reply message including a display of the plurality of resources associated with the at least one attribute to a sender of the invitation message.

17 Claims, 4 Drawing Sheets

System 100

METHOD AND SYSTEM FOR AN INVITATION TRIGGERED AUTOMATED SEARCH

BACKGROUND

Typically, a large organization, such as a company or corporation, includes several divisions/departments, each of which are working on one or more projects/assignments simultaneously. For example, Department A may be working on Project A, while the employees in Department B may be working on a different project, Project B. Often times, each project is a small aspect of the overall product or service that the organization provides.

Generally, such an organization builds a large volume of resources, skills, and information that can be useful to other employees within the organization that may be located across divisions/departments of the organization. For example, for both newly created projects and ongoing projects within the company, a significant effort on the part of management is made to find resources available to for the project. Such efforts may include setting up meetings with various managers to determine who might be available to start working on a project, finding resources for helping during an ongoing project, arranging dates. Often times, the routine tasks that management performs to obtain resources for a project are time consuming processes that can be costly in terms of set-up time to get a new project running and management man hours. This is largely due to the fact that management often is not aware of the individuals to contact and invite to the first project meeting. Moreover, project staffing typically occurs on a per-department or per-division basis, where projects are staffed by recruiting individuals in a particular department or division of the organization.

To aid management with obtaining resources for projects, organizations typically store project related data in one or more organization-wide repositories that anyone may internally search for information. Such repositories are typically manually populated with resources and/or manually searched to obtain resources and often times do not contain the information desired.

SUMMARY

In general, in one aspect, the invention relates to a method for performing an invitation triggered search by a query engine, comprising receiving an invitation message associated with a project, wherein the query engine is a recipient of the invitation message, extracting at least one attribute from the invitation message, searching a plurality of sources to identify a plurality of resources associated with the at least one attribute, and sending a reply message comprising a display of the plurality of resources associated with the at least one attribute to a sender of the invitation message.

In general, in one aspect, the invention relates to a system for performing an invitation triggered search, comprising a messaging client configured to generate an invitation message for a project, wherein a search system is a recipient of the invitation message, a query engine configured to extract at least one attribute associated with the project from the invitation message and search a plurality of sources to identify a plurality of resources associated with the at least one attribute, and a messaging system configured to send a reply message comprising the plurality of resources associated with the at least one attribute to the messaging client, wherein the plurality of resources are configured to provide information related to the project.

In general, in one aspect, the invention relates to a computer readable medium for performing an invitation triggered automated search, comprising software instructions to receive an invitation message associated with a project, wherein the query engine is a recipient of the invitation message, extract at least one attribute from the invitation message, search a plurality of sources to identify a plurality of resources associated with the at least one attribute, and send a reply message comprising a display of the plurality of resources associated with the at least one attribute to a sender of the invitation message.

Other aspects of the invention will be apparent from the following description and the appended claims.

DETAILED DESCRIPTION

Figure 1:
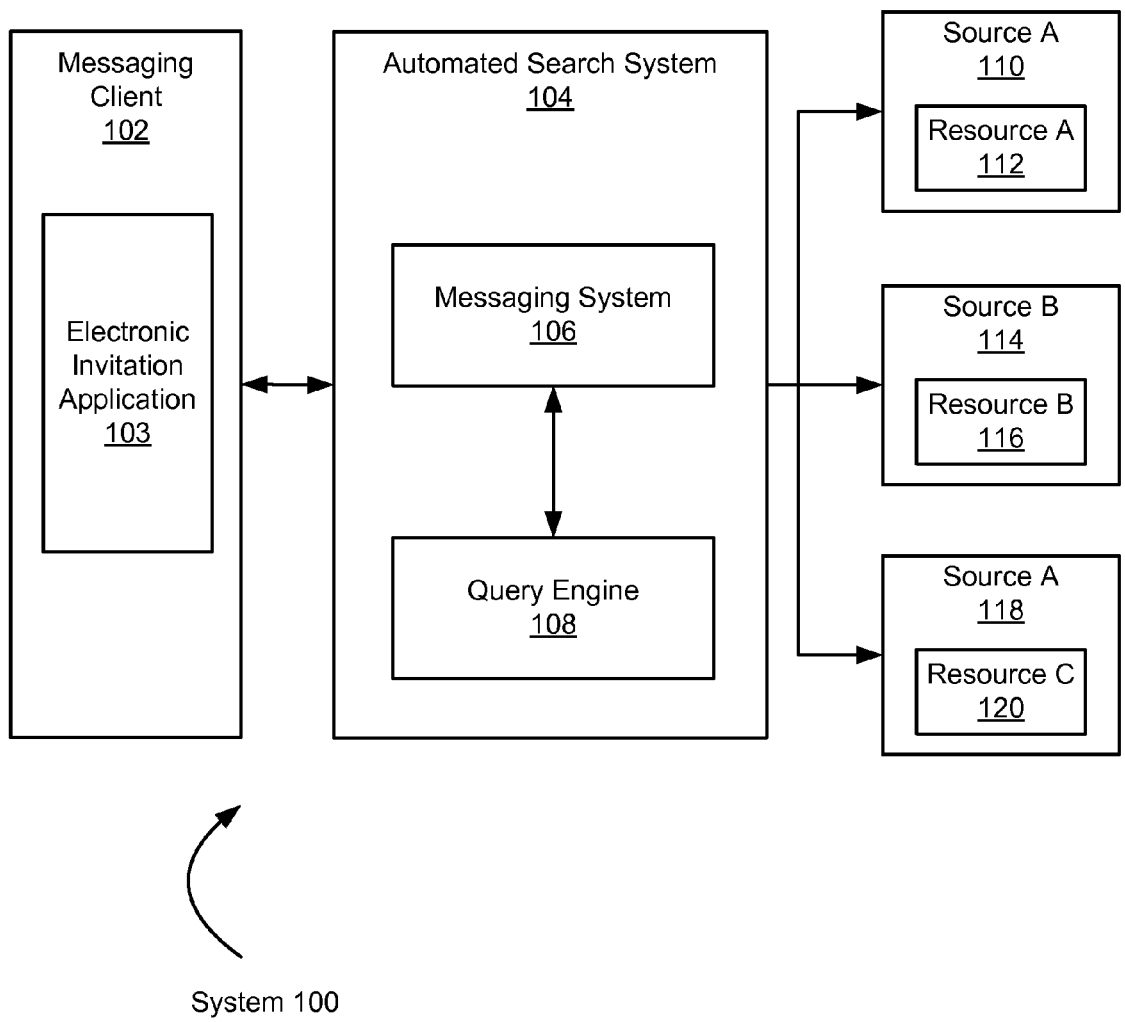
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for an automated search that locates resources within an organization. Specifically, embodiments of the invention provide a method and system for identifying resources that provide knowledge related to a project or assignment within an organization. More specifically, embodiments of the invention use a meeting invitation/request to facilitate communication between an individual seeking information resources and a system for performing the automated search for resources.

FIG. 1 shows a system (100) in accordance with one or more embodiments of the invention. Specifically, the system (100) of FIG. 1 includes a messaging client (102), an automated search system (104) including a messaging system (106) and a query engine (108), and a plurality of sources (i.e., Source A (110), Source B (114), Source C (118)), each including resources (i.e., Resource A (112), Resource B (116), and Resource C (120), respectively). Each of the aforementioned components of FIG. 1 are described below.

One or more embodiments of the invention provide an automated method for identifying resources that provide knowledge/information related to a project or assignment that is assigned within an organization to the organization's internal personnel (e.g., employees and/or independent contractors). An organization may be a corporation, a partnership, a non-profit organization, an enterprise, or any other suitable entity. Thus, one or more embodiments of FIG. 1 apply to an organization that operates on a project or assignment basis, where employees and/or independent contractors of the organization work on finite tasks, such as projects.

In one or more embodiments of the invention, the messaging client (102) may be any computing device, such as a computer system, a media device, a mobile phone, a personal digital assistant, or any other suitable electronic device. The messaging client (102) is configured to execute an electronic invitation application (103), such as an e-mail client, a calendar program, a text messaging application, or any other suitable invitation application. For example, the messaging client (102) may execute Microsoft Outlook® (Outlook is a registered trademark of Microsoft Corporation), Google™ Calendar, or any short messaging service (SMS) application. The electronic invitation application (103) is configured to generate an invitation message. Alternatively, in one or more embodiments of the invention, the messaging client (102) may execute an electronic invitation application (103) using a web browser (not shown). For example, the electronic invitation application (103) may be a web calendar or a web application that includes functionality to send an invitation message. Those skilled in the art will appreciate that in the aforementioned scenario, the messaging client (102) may not execute a local electronic invitation application (103) that is stored on the messaging client (102). The messaging client (102) is operatively connected to an automated search system (104). In one or more embodiments of the invention, the messaging client (102) is configured to send an invitation message to the automated search system (104).

The automated search system (104) includes a messaging system (106) and a query engine (108). In one or more embodiments of the invention, the automated search system (104) may be a server or other suitable computing device configured to perform a search for resources. In one or more embodiments of the invention, the automated search system (104) is configured to receive an invitation message from the messaging client (102). In one or more embodiments of the invention, the query engine (108) includes functionality to automatically perform a search based on attributes contained within the invitation message. Thus, the query engine (108) includes business logic that performs a search for resources based on the invitation message. For example, the query engine (108) may include functionality to parse the invitation message, extract the key words or attributes using which a search is performed, etc. In one or more embodiments of the invention, the query engine (108) may be a crawler configured to gather and categorize information resources available within the organization. Those skilled in the art will appreciate that the logic and operation of a crawler are well known in the art. The query engine (108) is also configured to send the search results to the messaging system (106) in the automated search system (104). The messaging system (106) is configured to receive the message from the query engine (108) and to send the message including the search results to the messaging client (102).

In one or more embodiments of the invention, the query engine (108) may be a plug-in to an e-mail client or a calendar program. More specifically, the query engine (108) may be software that is a feature that can be enabled/disabled as part of an e-mail client or calendar program, such as Microsoft Outlook® and/or Google™ Calendar. When the feature is enabled (i.e., turned on), the query engine (108) is able to receive invitation messages. In contrast, when the feature is disabled, the query engine (108) may not receive invitation messages.

Continuing with FIG. 1, the automated search system (104) is operatively connected to a plurality of sources (i.e., Source A (110), Source B (114), Source C (118)). A source may be any repository that stores resources (i.e., Resource A (112), Resource B (116), Resource C (120)). For example, a source (i.e., Source A (110), Source B (114), Source C (118)) may be a database internal to an organization that stores internal documents, a database of employees of the organization, a developer source code repository, and/or an internal forum (e.g., an online discussion board for an organization's internal personnel to post comments, information, links to helpful websites, questions and corresponding answers, etc). The aforementioned examples of sources are not an exclusive list, and are not meant to limit the invention in any way. A source may be any location or storage device that has information that may be used by employees of an organization in completing projects, assignments, or any other type of task. For example, a source (110, 114, 118) may be an e-mail client that stores internal employees' e-mails, a mobile phone that stores SMS messages, etc.

In one or more embodiments of the invention, a resource (112, 116, 120) is any type of information and/or metadata related to or useful for a project/assignment within the organization. For example, a resource (112, 116, 120) may be a person (e.g., employees of an organization, independent contractors associated with the organization), prior or active similar projects, user research, prior prototypes and concepts, source code, documents such as presentation slides, word documents, spreadsheets, and/or any other suitable document format, folder repositories, communication messages, such as e-mails and/or text messages, or any combination thereof.

Figure 2:
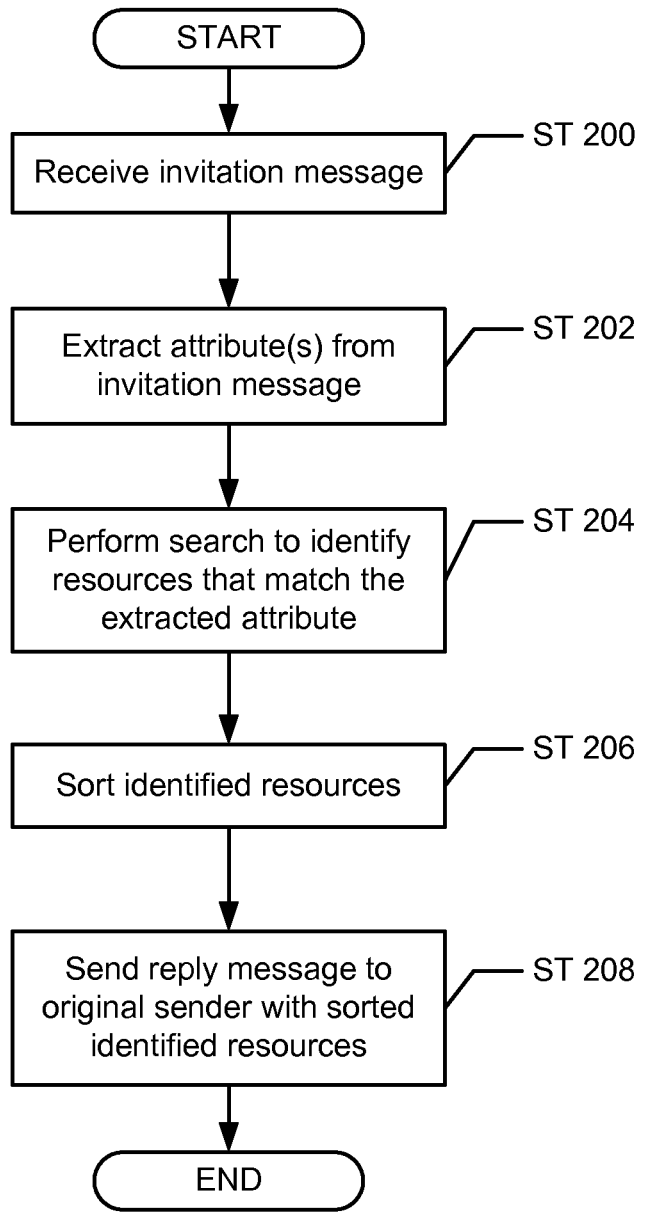
FIGS. 2-3 show flow charts in accordance with one or more embodiments of the invention.

FIG. 2 shows a flowchart for performing an invitation triggered automated search in accordance with one or more embodiments of the invention. Specifically, FIG. 2 describes a method for performing an invitation triggered automated search from the automated search system perspective. While the various steps in the flowchart of FIG. 2 are presented and described sequentially, one of ordinary skill in the art will appreciate that some or all of the steps may be executed in different orders, may be combined or omitted, and some or all of the steps may be executed in parallel. Accordingly, the specific arrangement of steps shown in FIG. 2 is not meant to limit the scope of the invention.

Initially, the automated search system receives an invitation message (ST 200). In one or more embodiments of the invention, the automated search system is a recipient of the invitation message sent from the messaging client. Alternatively, as described above, the automated search feature may be a plug-in to an e-mail client or a calendar program. In this case, in one or more embodiments of the invention, when the plug-in feature is enabled, the automated search system may interrupt the path of the invitation message from the original sender's local machine to the e-mail or calendar program. Upon interrupting the path of the invitation message, the automated search system may extract the attributes upon which a search for resources is to be performed. Then, the automated search system may remove itself as one of the listed recipients of the invitation message before sending the invitation message on its scheduled path to the other invitees/recipients. Alternatively, in one or more embodiments of the invention, the automated search system may simply receive a copy of the invitation message as a direct recipient, without interrupting the invitation message's path to other recipients.

Subsequently, the automated search system extracts at least one attribute from the invitation message (ST 202). In one or more embodiments of the invention, the attribute is data to use in a search query by the query engine. For example, the extracted attribute may be one or more keywords contained with in the subject line of an e-mail message, when the invitation message is sent via an email client. In one or more embodiments of the invention, the keyword(s) may be a text word or phrase related to the subject matter of a project/ assignment, a name of an attachment included in the invitation message, or any other suitable word or phrase associated with the invitation message. Alternatively, the extracted attribute may be a unique identifier associated with a project or assignment within an organization. For example, a unique identifier may be an alphanumerical ID, a project name, etc.

Next, a search is performed for resources that contain or are related to the extracted attribute (ST 204). During the search, the automated search system then identifies resources that match the extracted attribute. That is, the query engine searches multiple sources to locate and identify one or more resources that match the attribute extracted from the invitation message. For example, the query engine may identify local documents, websites, presentation slides, individuals, source code, or any other suitable resource that provides knowledge for the project/assignment associated with the extracted attribute. In one or more embodiments of the invention, the query engine includes functionality to exclude resources that are not relevant to the project query. That is, the query engine may identify resources that include the attributes contained within the invitation message, but may exclude the identified resources if the identified resource is irrelevant or outdated. At this stage, the query engine sorts the identified resources (ST 206). In one or more embodiments of the invention, the search results (i.e., identified resources) may be sorted in one or more of a variety of ways. For example, search results may be sorted into distinct categories. In this case, a listed of corresponding resources may be specified under each separate category. Categories of resources may include, for example, local documents, presentations, conference/seminar resources, source code, e-mails, individuals, etc. Alternatively, in one or more embodiments of the invention, search results may be sorted according to user-defined rankings/priorities. For example, the original sender of the invitation message may be provided with an option to specify a policy for sorting the search results, in which case the query engine organizes the search results according to the user-defined policy.

Those skilled in the art will appreciate that sorting the search results may include any type of organization of the identified resources. Further, those skilled in the art will appreciate that search results may also be sent to the original invitation message sender without being sorted. For example, links or paths to identified resources may simply be listed in the body of an email message that is sent by the automated search engine.

Upon sorting the search results, the automated search engine sends a message containing the sorted search results to the original sender of the invitation message (ST 208). That is, in one or more embodiments of the invention, the automated search engine generates a reply message directed to the original sender of the invitation message specifying one or more search attributes. In one or more embodiments of the invention, the reply message displays the identified resources in an organized manner. In one or more embodiments of the invention, the automated search engine generates a reply e-mail message to the original sender of the invitation message. In this case, the body of the reply e-mail may include an organized display of links to the identified resources.

Those skilled in the art will appreciate that the automated search system may include more than only the original sender of the invitation message as a recipient of the reply message. For example, the automated search system may be configured to reply to all the original communication aliases included in the original invitation message. More specifically, if the original invitation message is an e-mail invitation to a project meeting that included project members as recipients, the automated search system may send an automated reply message including the search results to all the project members included in the original invitation message.

Figure 3:
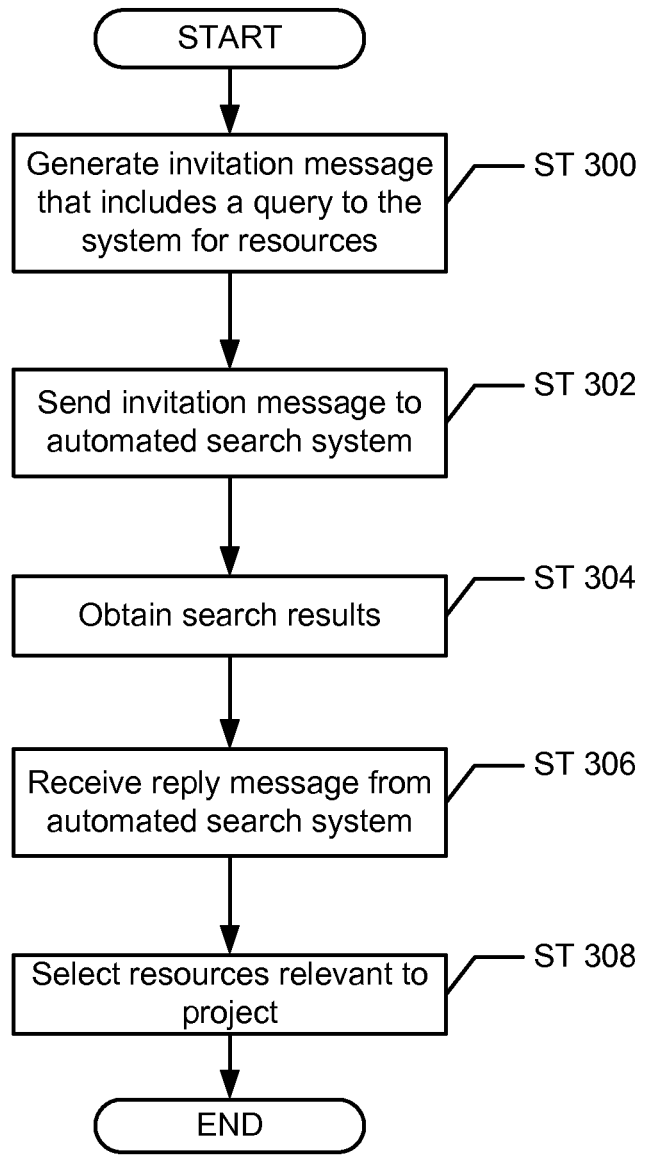

FIG. 3 shows a flowchart for performing an invitation triggered automated search in accordance with one or more embodiments of the invention. More specifically, FIG. 3 shows a method for obtaining resources from an automated search system from a user perspective. While the various steps in the flowchart of FIG. 3 are presented and described sequentially, one of ordinary skill in the art will appreciate that some or all of the steps may be executed in different orders, may be combined or omitted, and some or all of the steps may be executed in parallel. Accordingly, the specific arrangement of steps shown in FIG. 3 is not meant to limit the scope of the invention.

Initially, an invitation message that includes a query to the automated search system for resources is generated (ST 300). The invitation message may be generated using an e-mail client, a SMS application, a web calendar or appointment application, or any other suitable invitation application. In one or more embodiments of the invention, the invitation message is a structured query to the automated search system. The structure of the invitation message may be free-form or may adhere to a standard format known to the query engine and/or internal to the organization. Further, the invitation message may be generated by any personnel associated with an organization. For example, the invitation message may be generated by an employee (such as project manager and/or a research developer), an independent contractor, a vendor, etc.

In one or more embodiments of the invention, the invitation message includes at least one attribute used to search for resources. For example, the invitation message may include keywords in the subject line, the body of the message, as the name of an attachment document or image included with the invitation message, or in any other suitable location within the invitation message. In one or more embodiments of the invention, the invitation message includes a communication alias associated with the automated search system as a recipient. For example, when the invitation message is generated using an e-mail client or a web calendar, the automated search system alias may be an e-mail address. More specifically, the automated search system alias may be search@organization.com, projectinfo@organization.com, resourcesearch@organization.com, or any similar communication alias.

Those skilled in the art will appreciate that the invitation message may include other recipients in addition to the automated search system. For example, the invitation message may be a project meeting invite that is sent to project team members and to the automated search system to obtain information helpful for the project meeting. Alternatively, in one or more embodiments of the invention, the invitation message may be directed only to the automated search system.

Continuing with FIG. 3, the invitation message is sent to the automated search system (ST 302). Subsequently, a reply message is received from the automated search system (ST 304). Upon receiving the reply message, the search results are obtained (ST 306). That is, the identified resources and corresponding locations of the identified resources that are displayed in the body of the reply message are obtained. As described above, the identified resources may be displayed in an organized, sorted format. In this case, the individuals that receive the reply message view the search results in the organized, sorted format. At this stage, the resources relevant to the project/assignment for which the query was requested are selected and used to obtain knowledge for the project/assignment (ST 308). In one or more embodiments of the invention, selecting the relevant resources may involve clicking on links to the locations of the resources.

In one or more embodiments of the invention, the individual(s) that receive the reply message with the identified resources from the automated search system may refine the search attributes and re-send the invitation message to the automated search system. For example, if the search results obtained are not helpful or are not directed toward the correct project, the original sender of the invitation message may reply back to the reply message from the automated search system with refined attributes for a new search.

The following examples illustrate various embodiments of the invention. Consider the scenario in which a project manager within an organization sets up a new project meeting to discuss an upcoming project involving the generation of a new software program. In this case, the project manager is aware of the individuals that are going to be staffed on the new project. The project manager may invite the project team members (who are already known) to the first project meeting using an e-mail client, and include the automated search system as a recipient of the e-mail invitation. In this case, suppose the project manager creates an e-mail invitation in which the subject line includes the language in which the software program is going to be written, and the e-mail invitation includes an attachment of a brief write up of the project details.

Upon receiving the e-mail invitation, the automated search system extracts the keywords from the subject line and the attachment of the e-mail invitation, and performs a search for resources that provide information/knowledge about the programming language and/or the subject matter of the project. For example, the automated search system may identify resources from an internal source code repository, a recent presentation made by another employee within the organization about this project, and the identification details of the employee who made the recent presentation. The automated search system may further organize/sort the identified resources according to category or user-defined preferences. The project manager then receives a reply message back from the automated search system with the links to the various related resources that may provide information about the new project and/or be useful for the initial project meeting.

Those skilled in the art will further appreciate that while embodiments of the invention discussed above focus on obtaining knowledge/information for projects and/or assignments assigned within an organization, an invitation message may be generated by anyone internal to an organization to obtain resources for any purpose. For example, consider the scenario in which an employee of an organization design an inventive product or brainstorms an inventive idea that the organization desires to protect using intellectual property. In this case, the organization may request the employee to submit the inventive product/idea in a formal manner so that the organization may take steps to protect the intellectual property. In one or more embodiments of the invention, the employee may query the automated search system to obtain resources that provide knowledge related to intellectual property.

For example, the employee may generate and send an invitation message to the automated search system that includes keywords such as inventive idea submissions, intellectual property, patents, trademarks, etc. In this case, the automated search system may "crawl" and search for resources that include information on the keywords contained within the invitation message. Further, the automated search engine may categorize the search results by the type of intellectual property. For example, categories may include "general", "patents," "trademarks," "submissions," "rewards," etc. The employee, upon receiving the reply message from the automated search system, may quickly scan the categories and find the resources the employee is seeking. Alternatively, the employee may specify that the organization is looking to file a patent related to the inventive product/idea, in which case the automated search system may prioritize resources with the keyword "patent" and include those search results first in the reply message.

In an alternate scenario, consider the example in which an employee has an idea to pursue, e.g., a time clock in/out using a mobile phone. In addition to sending a message to a manager asking for permission to pursue the concept, the employee may also copy the search system on the message. The search system may then return projects related to time clock in/out using mobile phones. The search system may also allow the employee to discover that a project is already in the works for such an idea, or provide relevant user experience information on past projects related to the idea. The search system may also provide the name of the former project manager for one or more past related projects in the body of the reply message.

In one or more embodiments of the invention, an employee or other entity may hold resources in an email or a local document. In the scenario in which the automated search system is implemented as a plug-in to an e-mail or calendar client, an auto-generated request to "release" the specific resource held by the entity may be sent to the search system. For example, Employee A may initiate a search for resources through one of the methods described above. In response to the search query, the automated search system locates a resource in the body of an email generated by Employee B. The search system then requests permission from Employee B to release the e-mail to employee A. Such a request/response method preserves the organizational privacy associated with personal document and/or communication messages such as e-mail messages. In addition to allow for the release of the e-mail, Employee B may also choose to extract a portion of the email and respond to the search system with the extracted portion.

Figure 4:
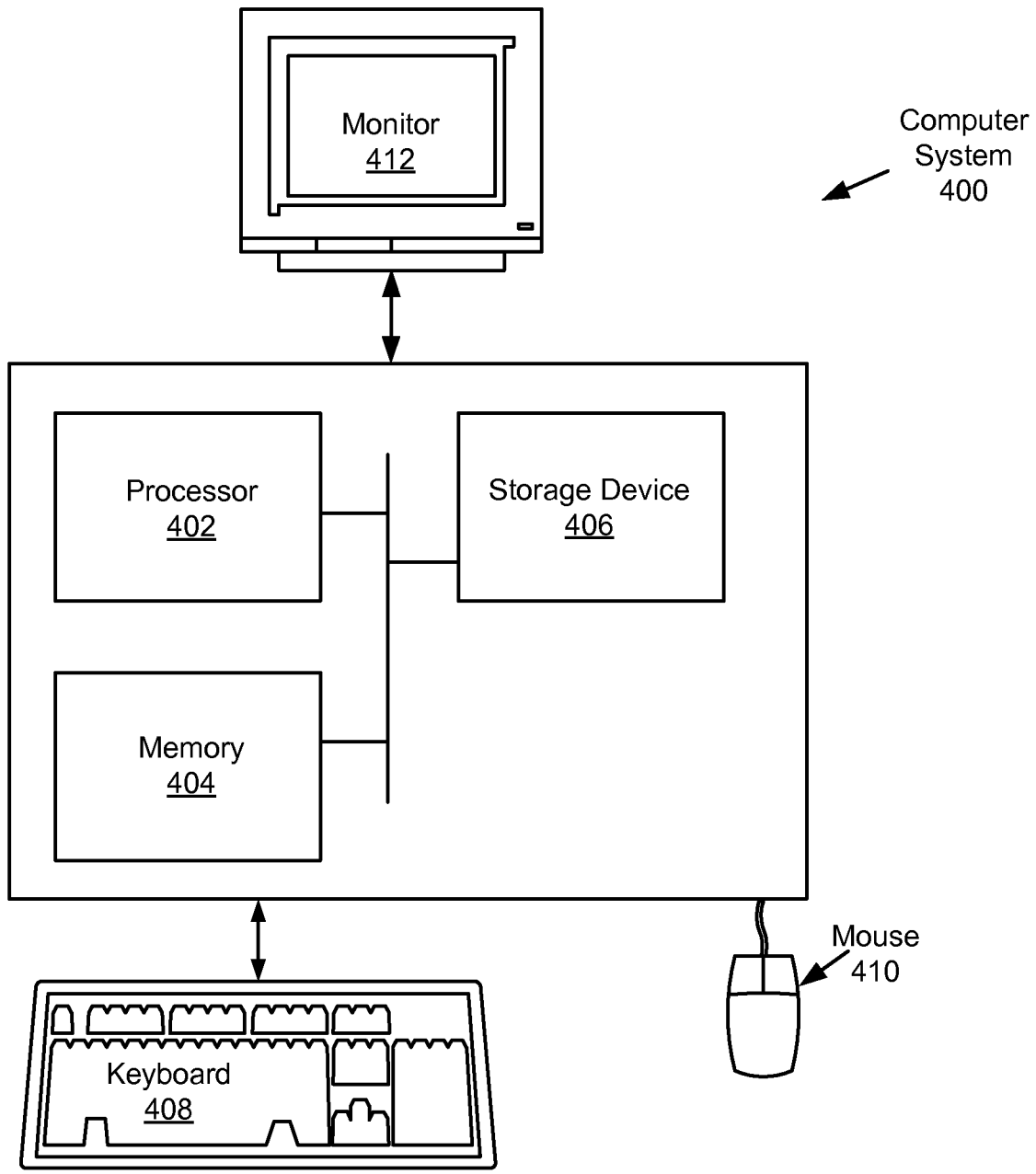
FIG. 4 shows a computer system in accordance with one or more embodiments of the invention.

The invention may be implemented on virtually any type of computing device regardless of the platform being used. For example, as shown in FIG. 4, a computer system (400) includes a processor (402), associated memory (404), a storage device (406), and numerous other elements and functionalities typical of today's computers (not shown). The computer (400) may also include input means, such as a keyboard (408) and a mouse (410), and output means, such as a monitor (412). The computer system (400) is connected to a local area network (LAN) or a wide area network (e.g., the Internet) (not shown) via a network interface connection (not shown). Those skilled in the art will appreciate that these input and output means may take other forms, now known or later developed. Further, software instructions to perform embodiments of the invention may be stored on a tangible computer readable medium such as a compact disc (CD), a diskette, a tape, or any other suitable tangible computer readable storage device.

Embodiments of the invention provide a method for obtaining knowledge for tasks assigned within an organization. More specifically, embodiments of the invention provide a method for performing an automated search based on an invitation message sent to a system that is configured to perform the search for resources. For example, in one or more embodiments of the invention, the automated search is triggered by a common function performed to invite project members to a first project meeting. Further, the search performed by the automated search system is a robust search for resources from a variety of sources internal to the organization. Further, the search results may be personalized for an individual within the organization and/or specifically tailored for a corporation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for performing an invitation triggered search by a query engine, comprising:
   receiving, by the query engine executing on a processor of a computer system, an invitation message associated with a project,
      wherein the invitation message is an e-mail invitation,
      wherein the invitation message is sent to a plurality of recipients and the query engine, and
      wherein the plurality of recipients comprises an individual person who is a project member of the project;
   interrupting a transmission of the invitation message to an e-mail client to extract at least one attribute associated with the project from the invitation message, wherein the at least one attribute is located in the subject line of the e-mail invitation;
   searching, by the query engine in response to receiving the invitation message, a plurality of sources to identify a plurality of resources associated with the at least one attribute;
   sending, from the query engine, a reply message comprising the plurality of resources associated with the at least one attribute to the individual person and a sender of the invitation message;
   removing the query engine as a recipient of the plurality of recipients after the at least one attribute is extracted; and
   resuming transmission of the invitation message to the e-mail client.

2. The method of claim 1, wherein the invitation message is addressed to a plurality of individuals and invites the plurality of individuals to a project meeting related to the project.

3. The method of claim 1, wherein the query engine requests permission to release an identified resource.

4. The method of claim 1, further comprising:
   generating a plurality of rankings for the plurality of resources according to a criterion set by the sender, wherein the display includes the plurality of rankings; and
   sorting the display of the plurality of resources to organize the plurality of resources by category.

5. The method of claim 1, wherein the query engine is a plug-in to a calendar program configured to send meeting invitations.

6. The method of claim 1, wherein the project and the plurality of sources are internal to an organization.

7. The method of claim 1, wherein the query engine comprises a crawler for searching the plurality of sources.

8. The method of claim 1, wherein the plurality of sources comprise at least one selected from a group consisting of a document repository, a source code repository, and an internal forum.

9. The method of claim 1, wherein the plurality of resources comprise at least one selected from a group consisting of a document, a presentation slide, an individual, an e-mail message, a text message, and source code.

10. The method of claim 1, wherein the at least one attribute is extracted from an attachment included with the invitation message.

11. The method of claim 1, further comprising:
    receiving a selection of a resource from the plurality of resources after sending the reply message.

12. A system for performing an invitation triggered search, comprising:
    a hardware processor;
    a messaging client executing on the hardware processor and configured to generate an invitation message for a project,
       wherein the invitation message is an e-mail invitation,
       wherein the invitation message is sent to a plurality of recipients and a query engine, and
       wherein the plurality of recipients comprises an individual person who is a project member of the project;
    a query engine, operatively coupled to the messaging client, executing on the hardware processor, and configured to:
       extract at least one attribute associated with the project from the invitation message; and
       search, in response to receiving the invitation message, a plurality of sources to identify a plurality of resources associated with the at least one attribute; and
    a messaging system, operatively coupled to the query engine, executing on the hardware processor, and configured to:
       interrupt a transmission of the invitation message to an e-mail client to extract the at least one attribute;
       send a reply message comprising the plurality of resources associated with the at least one attribute to the individual person and the messaging client;
       remove the query engine as a recipient of the plurality of recipients after the at least one attribute is extracted; and
       resume of the invitation message to the e-mail client,
    wherein the plurality of resources are configured to provide information related to the project.

13. The system of claim 12, further comprising:
    a search system operatively connected to the messaging client and comprising the messaging system and the query engine.

14. The system of claim 12, wherein the plurality of sources and the project are internal to an organization.

15. The system of claim 12, wherein the query engine comprises a crawler for searching the plurality of sources internal to the organization.

16. The system of claim 12, wherein the query engine is a plug-in to a calendar program configured to send meeting invitations.

17. A non-transitory computer readable storage device storing software instructions for performing an invitation triggered automated search, the software instructions, when executed by a computer, comprising functionality to:
    receive, by a query engine executing on the computer, an invitation message associated with a project,
       wherein the invitation message is an e-mail invitation,
       wherein the invitation message is sent to a plurality of recipients and the query engine, and
       wherein plurality of recipients comprises an individual person who is a project member of the project;
    interrupt a transmission of the invitation message to an e-mail client to extract at least one attribute associated with the project from the invitation message, wherein the at least one attribute is located in the subject line of the e-mail invitation;

search, by the query engine in response to receiving the invitation message, a plurality of sources to identify a plurality of resources associated with the at least one attribute;

send, from the query engine, a reply message comprising the plurality of resources associated with the at least one attribute to the individual person and a sender of the invitation message;

remove the query engine as a recipient of the plurality of recipients after the at least one attribute is extracted; and resume transmission of the invitation message to the e-mail client.

\* \* \* \* \*